(12) United States Patent
Weiner

(10) Patent No.: US 9,985,778 B2
(45) Date of Patent: *May 29, 2018

(54) SINGLE WIRE SYSTEM CLOCK SIGNAL GENERATION

(71) Applicant: Atmel Corporation, San Jose, CA (US)

(72) Inventor: Albert S. Weiner, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/438,064

(22) Filed: Feb. 21, 2017

(65) Prior Publication Data

US 2017/0163412 A1    Jun. 8, 2017

Related U.S. Application Data

(63) Continuation of application No. 14/546,564, filed on Nov. 18, 2014, now Pat. No. 9,612,609.

(51) Int. Cl.
*H04L 7/04* (2006.01)
*H04L 7/00* (2006.01)
*H04L 12/26* (2006.01)

(52) U.S. Cl.
CPC .............. *H04L 7/04* (2013.01); *H04L 7/0016* (2013.01); *H04L 43/16* (2013.01)

(58) Field of Classification Search
CPC .............. H04L 25/0272; H04L 25/4902; H04L 12/2836; H04L 12/40006; H04L 2012/40267; H04L 7/04; H04L 7/0016; H04L 43/16
See application file for complete search history.

(56) References Cited

U.S. PATENT DOCUMENTS

| | | |
|---|---|---|
| 4,920,282 A | 4/1990 | Muraoka et al. |
| 5,812,004 A | 9/1998 | Little |
| 6,532,506 B1 | 3/2003 | Dunstan et al. |
| 6,853,733 B1 | 2/2005 | Groothedde et al. |
| 7,606,955 B1 | 10/2009 | Falik et al. |
| 7,729,427 B2 | 6/2010 | Kwok |

(Continued)

FOREIGN PATENT DOCUMENTS

| | | |
|---|---|---|
| CN | 1957311 | 5/2007 |
| CN | 102160045 | 8/2011 |

(Continued)

OTHER PUBLICATIONS

Taiwan Office Action in Taiwan Application No. 104137944, dated May 22, 2017, 11 pages.

(Continued)

*Primary Examiner* — Kabir A Timory
(74) *Attorney, Agent, or Firm* — Fish & Richardson P.C.

(57) ABSTRACT

This specification describes an integrated circuit comprising: a single wire interface; a clock circuit configured to detect a voltage from the single wire interface and to generate a clock signal having a frequency that is based on the detected voltage; and a digital system coupled with the single wire interface and the clock circuit. The digital system is configured to: receive a data signal from the single wire interface; power the digital system using a power signal from the single wire interface; and perform one or more operations clocked by the clock signal.

20 Claims, 4 Drawing Sheets

(56) References Cited

U.S. PATENT DOCUMENTS

| | | |
|---|---|---|
| 8,060,664 B2 | 11/2011 | Kim et al. |
| 8,509,318 B2 | 8/2013 | Tailliet |
| 2004/0049616 A1 | 3/2004 | Dunstan |
| 2008/0315934 A1 | 12/2008 | Engl |
| 2009/0013100 A1 | 1/2009 | Lee |
| 2009/0235104 A1* | 9/2009 | Fung .................... G06F 1/3203 713/324 |
| 2010/0231787 A1 | 9/2010 | Kim |
| 2013/0197920 A1 | 8/2013 | Lesso |
| 2014/0112089 A1* | 4/2014 | Tsang ...................... G11C 8/18 365/233.1 |
| 2016/0142201 A1 | 5/2016 | Weiner |

FOREIGN PATENT DOCUMENTS

| | | |
|---|---|---|
| CN | 102957507 | 3/2013 |
| CN | 104348587 | 2/2015 |
| TW | I351153 | 10/2011 |
| TW | 201306488 | 2/2013 |
| TW | M486099 | 9/2014 |
| WO | WO 2005/119403 | 12/2005 |

OTHER PUBLICATIONS

Chinese Office Action in Chinese Application No. 201510784625.6, dated Jul. 20, 2017, 6 pages.

* cited by examiner

SINGLE WIRE SYSTEM CLOCK SIGNAL GENERATION

CLAIM OF PRIORITY

This application claims priority under 35 USC § 119(e) to U.S. patent application Ser. No. 14/546,564, filed on Nov. 18, 2014, the entire contents of which are hereby incorporated by reference

TECHNICAL FIELD

This disclosure relates generally to electronics and more particularly to single wire systems.

BACKGROUND

In an example scenario, a system can use a single interface for both data communications and power. For example, some single wire systems have two pins, one for the single wire interface and one for ground. Some single wire systems are driven by a fixed value pull-up resistor. There, the system power is limited by design to be within the limits of the specified resistor value. The system design can be matched to this value.

Additionally, in one example scenario, various chips are configured to operate at lower voltages, and the current demands may exceed the amount of current that may be supplied with a simple resistor. To meet those demands, some systems may be designed to operate in two modes: input/output (I/O) mode and execution mode. During I/O mode, the resistor would power the system. During execution mode, the user would provide an alternate power source, typically an output from another chip, to provide extra drive.

However, in an example scenario, two-mode systems can have disadvantages compared to simpler systems. For example, a two-mode system may implement timing control from the user, where the user must know when to turn on the alternate source, and when to turn it off to allow I/O. As another example, the two-mode systems may be designed to handle the execution mode current through the alternate source. The alternate source may be designed to meet certain design tolerances to meet multiple maximum requirements of the chip, e.g., timing and power requirements.

SUMMARY

This specification describes an integrated circuit comprising: a single wire interface; a clock circuit configured to detect a voltage from the single wire interface and to generate a clock signal having a frequency that is based on the detected voltage; and a digital system coupled with the single wire interface and the clock circuit. The digital system is configured to: receive a data signal from the single wire interface; power the digital system using a power signal from the single wire interface; and perform one or more operations clocked by the clock signal.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
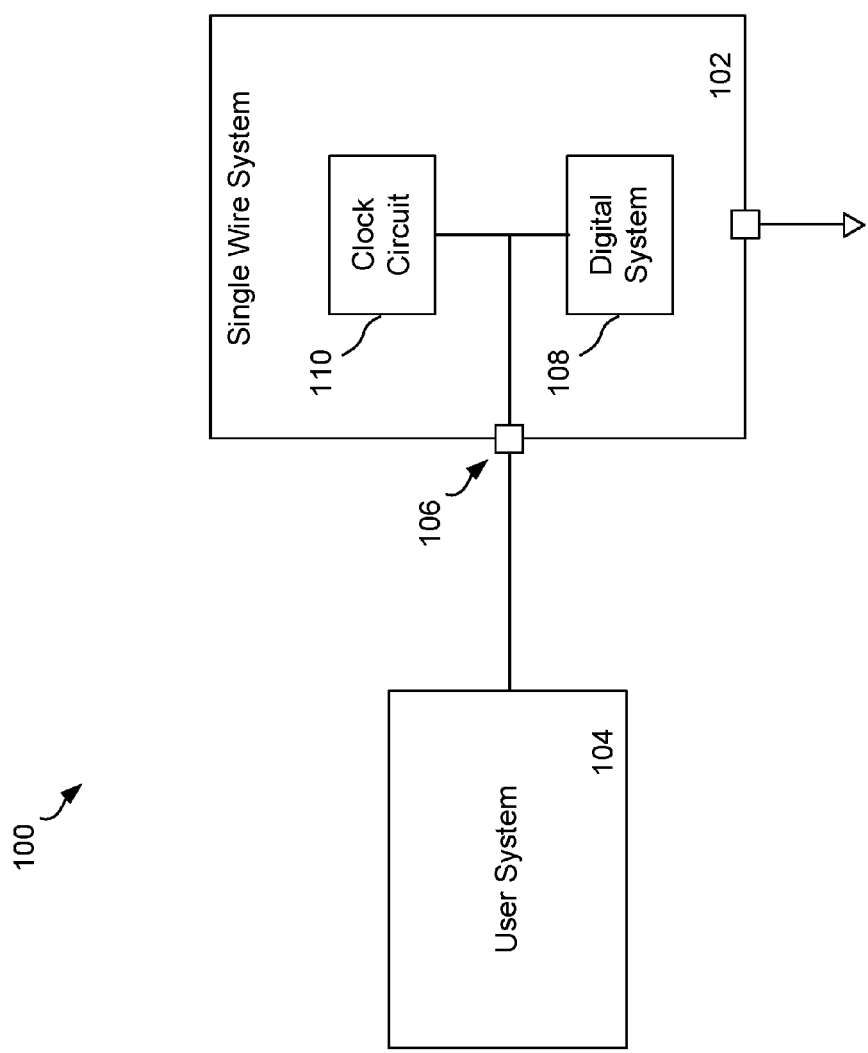
FIG. 1 is a block diagram of an example system including a single wire system and a user system.

FIG. 1 is a block diagram of an example system 100 including a single wire system 102 and a user system 104. The single wire system 102 can be an integrated circuit and the user system 104 can be any appropriate device that is configured to provide both power and input/output for the single wire system 102.

The single wire system 102 includes a single wire interface 106. The single wire interface 106 can be a pin on an external portion of an integrated circuit. The user system 104 can be coupled with the single wire system 102 by wire bonding to the single wire 106 or by any other appropriate electrical coupling.

The single wire system 102 includes a digital system 108 and a clock circuit 110. The clock circuit 110 provides a clock signal to the digital system 108. The digital system 108 can be implemented as any appropriate digital circuit. The digital system 108 is configured to provide a specified logic function for the single wire interface 106.

The digital system 108 can perform any of one or more appropriate logic functions. For example, the digital system 108 can perform an identification function or a cryptographic function. The user system 104 can provide data to the digital system 108 using the single wire interface 106, and the digital system 108 can then process the data. The digital system 108 returns the processed data to the user system 104 using the single wire interface 106. The digital system 108 load current is primarily controlled by the frequency of the clock signal, and the performance of the digital system 108, e.g., the time to perform a specified operation, is tied to the frequency of the clock signal.

While the digital system 108 is performing a logic function, the single wire system 102 draws power from the single wire interface 106. The clock circuit 110 is configured to dynamically adapt the frequency of the clock signal based on the available power of the system 102 by detecting a voltage from the single wire interface 106 and generating a clock signal having a frequency based on the detected voltage. For example, the clock circuit 110 can adjust the frequency of the clock signal to be proportional to the detected voltage.

Because the voltage at the single wire interface 106 will switch between a high and a low voltage as input and output are generated, that voltage may not be suitable for controlling the clock circuit 110 to generate the clock signal. The single wire system 102 can rectify the input signal at the single wire interface 106 and supply the rectified signal to the clock circuit 110. For example, a diode and a capacitor can be used to rectify the input signal.

In some implementations, the clock circuit 110 is configured to detect a rectified voltage from the single wire interface 106 over a period of time and adjust the frequency of the clock signal based on the detected rectified voltage. In some implementations, the clock circuit 110 is configured to adjust the frequency of the clock signal to a target frequency within a range of specified frequencies based on a difference between the detected voltage and a threshold voltage.

In some implementations, the clock circuit 110 is configured to decrease the frequency of the clock signal in response to determining that the detected voltage is below a threshold voltage. This can be useful, for example, so that the digital system 108 can continue operating as the voltage drops, albeit at a slower pace. The user system 104 can freely trade between chip performance and power available without having to redesign the user system 104 or reconfigure the single wire system 102.

The clock circuit 110 can be implemented as a digital circuit, e.g., using digital divider circuits, or as an analog circuit, e.g., using any appropriate voltage-frequency technology, or as a combination of both. A voltage controller oscillator can be used to implement the clock circuit 110. In some implementations, the clock circuit 110 is configured to stop generating the clock signal if the detected voltage from the single wire interface drops to zero for a period of time, indicating an input signal from the user system 104.

In some implementations, the single wire system 102 is an integrated circuit having only two pins, one for ground and one for the single wire interface 106. In some other implementations, the single wire system 102 has other pins in addition to the single wire interface 106.

Example System

Figure 2:
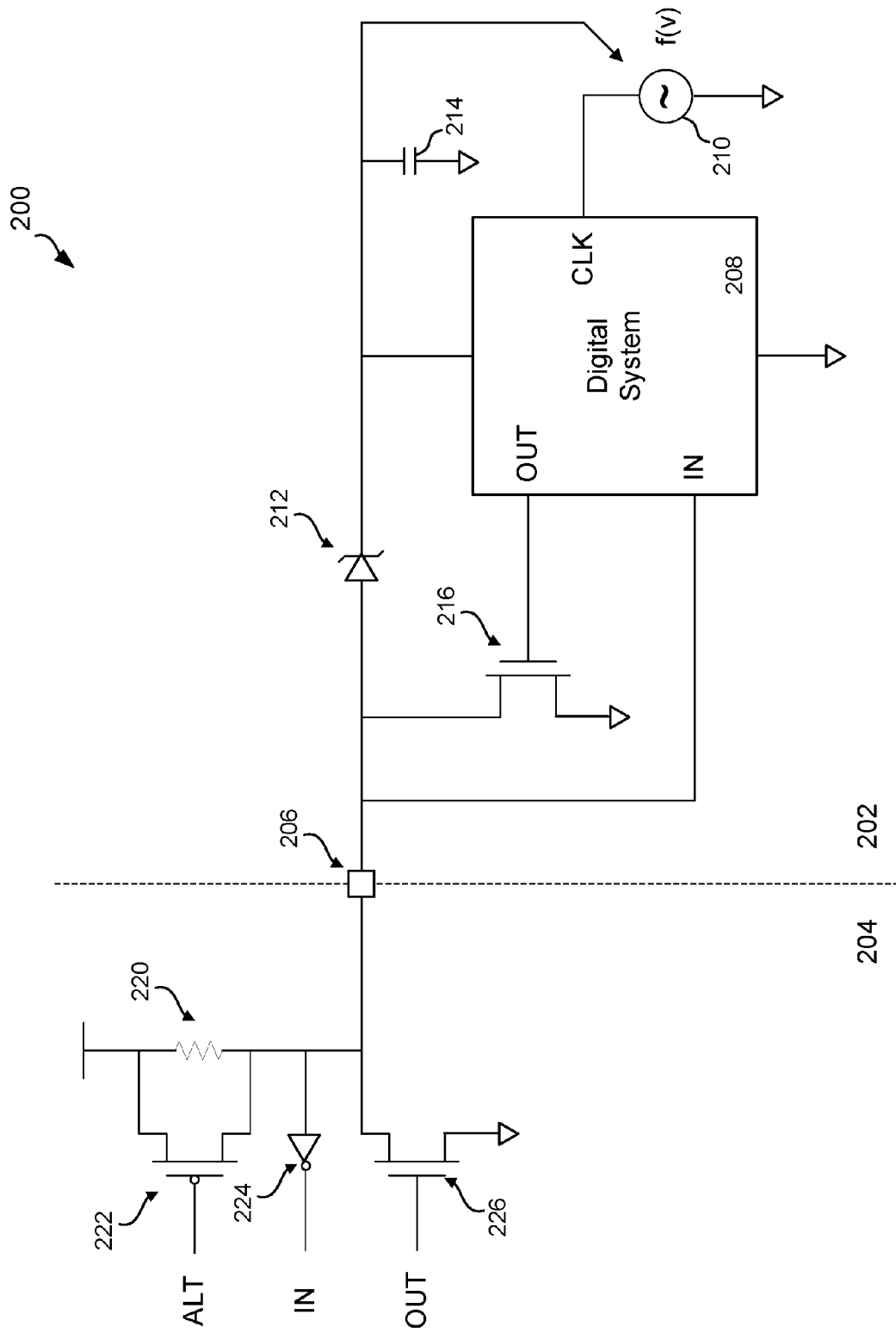
FIG. 2 is a block diagram of an example clock circuit.

FIG. 2 is a block diagram of an example system 200 including an example single wire system 202 and an example user system 204. The user system 204 is coupled with the single wire system 202 by a single wire interface 206, e.g., a pin on an integrated circuit.

The single wire system 202 includes a digital system 208 and a clock circuit 210. The clock circuit is configured to detect a voltage from the single wire interface 206 by a connection through a diode 212. The single wire system 202 includes a capacitor 214 that provides charge storage for the digital system 208 when the voltage at the single wire interface 206 is at a low voltage, e.g., ground. The clock circuit 210 generates a clock signal based on the detected voltage from the single wire interface 206 and provides the clock signal to a CLK interface on the digital system 208.

The clock circuit 210 is configured to dynamically adapt the frequency of the clock signal based on the available power of the single wire system 202 by detecting a voltage from the single wire interface 206 and generating a clock signal having a frequency based on the detected voltage. The clock circuit 210 typically detects the voltage at a node behind the single wire interface 206 itself because the voltage there alternates between high and low. For example, the clock circuit 210 can use a voltage detected at a node between the diode 212 and the capacitor 214 that provides a rectified input voltage. In other examples, the clock signal can detect the voltage at any appropriate point within the single wire system that is representative of the available power to the system.

The digital system 208 receives data at an IN interface by a connection to the single wire interface 206. The digital system 208 outputs data at an OUT interface by a connection to the single wire interface 206 through a transistor 216.

The user system 204 provides power to the single wire system 202 using a pull-up resistor 220. The user system 204 can also provide alternative power from an ALT interface using a transistor 222 coupled with the pull-up resistor 220. The user system 204 receives data at an IN interface by a connection to the single wire interface 206 through a buffer 224. The user system 204 outputs data at an OUT interface by a connection to the single wire interface 206 through a transistor 226.

Example Frequency Response Curve

Figure 3:
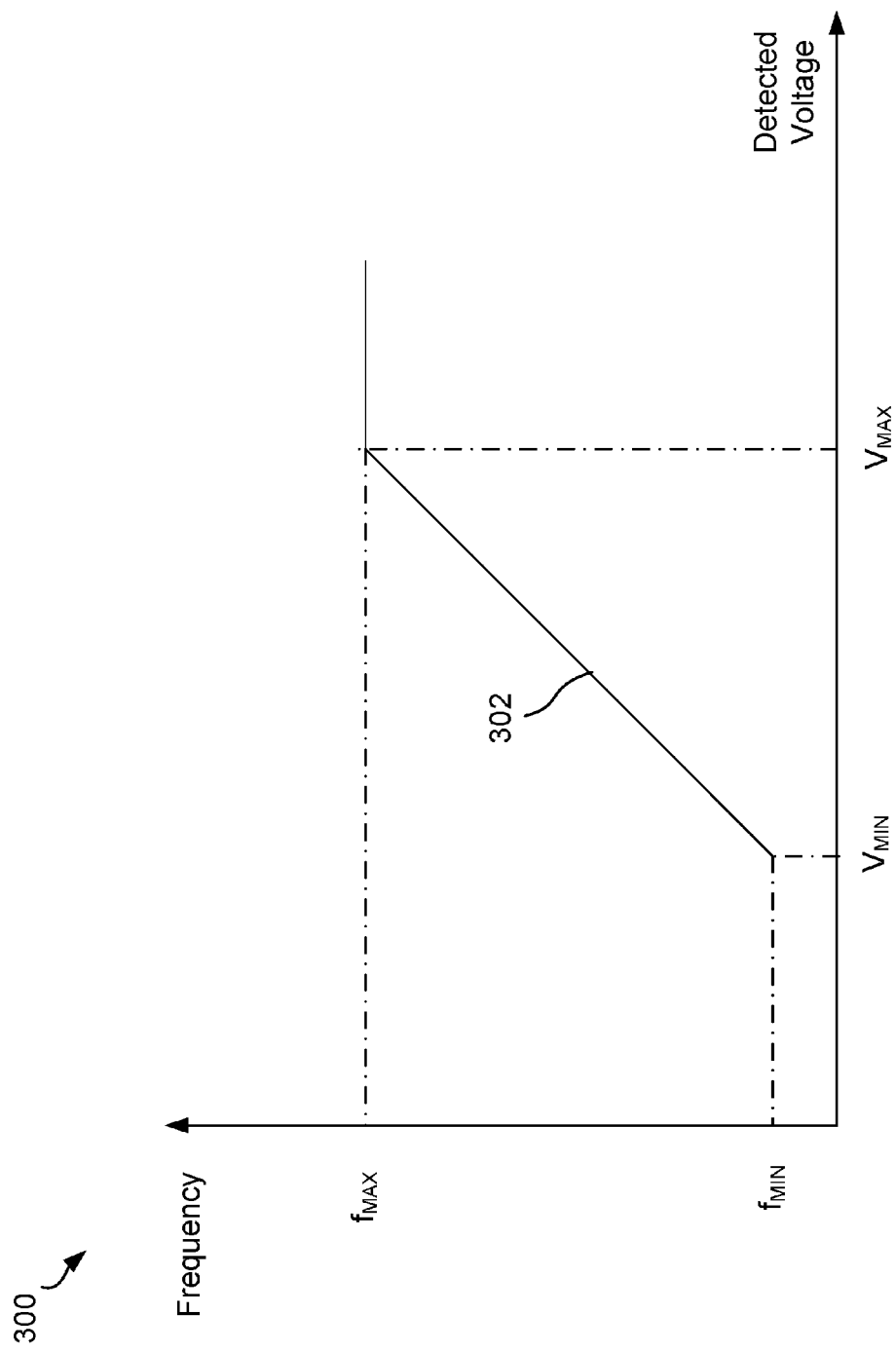
FIG. 3 is a chart of an example frequency response curve for the clock circuit of FIG. 1.

FIG. 3 is a chart 300 of an example frequency response curve 302 for the clock circuit 110 of FIG. 1. The horizontal axis plots the detected voltage from the single wire interface 106, and the vertical axis plots the frequency of the clock signal as generated by the clock circuit 110.

Between detected voltages of $V_{MAX}$ and $V_{MIN}$, the clock circuit 110 adjusts the frequency of the clock signal to be proportional to the detected voltage. The clock circuit 110 adjust the frequency of the clock signal to a target frequency between upper and lower limits of $f_{MIN}$ and $f_{MAX}$. If the detected voltage drops below $V_{MIN}$, the system can respond in one of several ways. In a first example, the generated frequency will remain at $f_{MIN}$ until the system can no longer function. In a second, example, the internal clock is stopped. Stopping the clock can be useful for example, so that the user system 104 can drop a supplied voltage to cause the detected voltage to drop below $V_{MIN}$ as an indication to halt the operation of the system 102.

Although the curve as illustrated 302 has a constant slope, the clock circuit 110 can be configured to respond in other ways. For example, where the clock circuit 110 is implemented as a digital circuit, an arbitrary curve can be programmed into the clock circuit 110. The curve can be a parabolic curve, dropping slowly when the detected voltage is near $V_{MAX}$ and dropping rapidly as the detected voltage approaches $V_{MIN}$.

Example Flowchart

Figure 4:
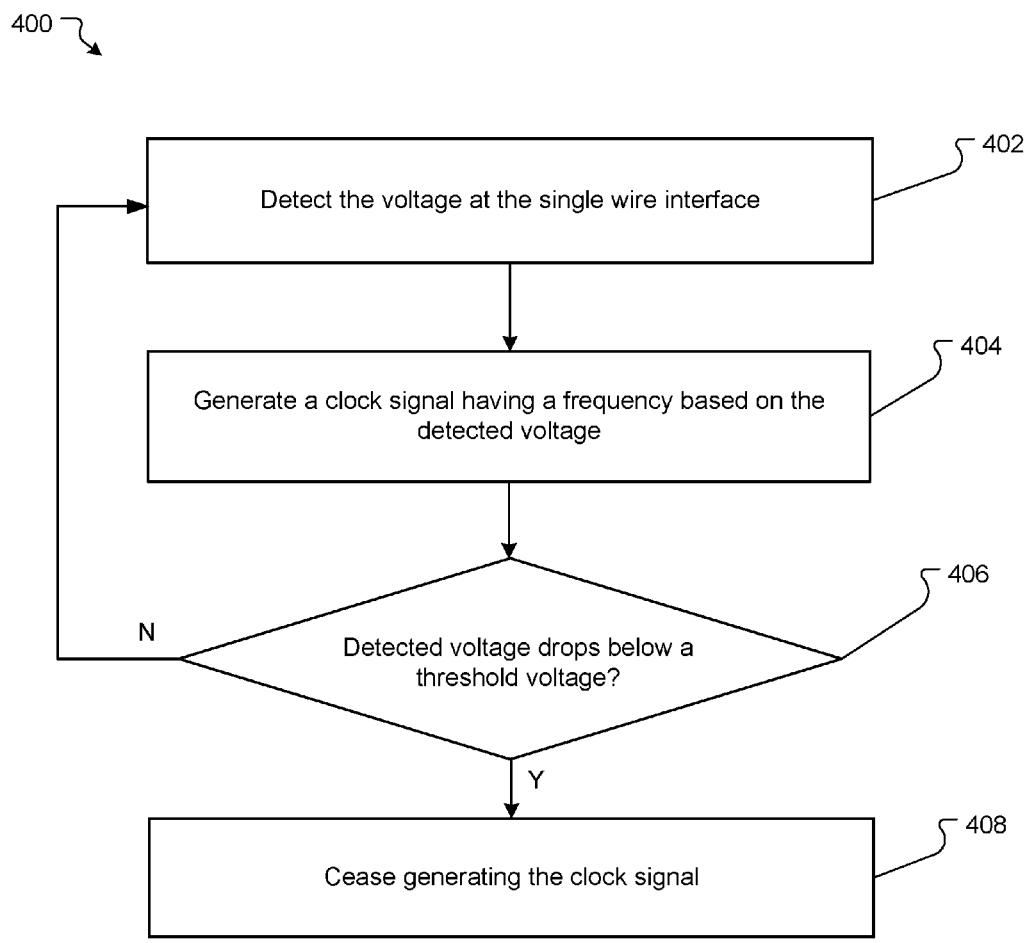
FIG. 4 is a flow diagram of an example process performed by the clock circuit of FIG. 1.

FIG. 4 is a flow diagram of an example process 400 performed by the clock circuit 110 of FIG. 1.

The clock circuit 110 detects a voltage from the single wire interface 106 (402). For example, the clock circuit 110 can detect a rectified voltage from the single wire interface 602. The clock circuit 110 can detect a rectified voltage from the single wire interface 602 over a period of time. The period of time can be selected based on an anticipated data speed for the single wire interface. The voltage varies as the user system 104 provides data or provides a signal that lacks data but provides power.

The clock circuit 110 generates a clock signal having a frequency based on the detected voltage (404). For example, the frequency can be proportional to the detected voltage. The clock circuit 110 can decrease the frequency as the detected voltage drops, which results in the digital system 108 operating at a reduced speed.

The clock circuit 110 determines whether the detected voltage drops below a threshold voltage (406). The voltage dropping below the threshold voltage can be an indication from the user system 104 to cease operations. If the detected voltage drops below the threshold voltage, the clock circuit 110 ceases generating the clock signal. If the detected voltage does not drop below the threshold voltage, the clock circuit 110 continues detecting the voltage and generating the clock signal (return to 402).

Particular embodiments of the subject matter described in this specification can be implemented so as to realize one or more of the following advantages. First, a single wire system can be clocked at a frequency based on available power. Second, a user system of the single wire system can be more flexible, e.g., by trading between system performance and power available without redesigning the user system or reconfiguring the single wire system. Third, the single wire system can continue to operate by reducing the clock frequency when the available power drops.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination

What is claimed is:

1. An integrated circuit of a single wire system, comprising:
   a single wire interface from which the single wire system is configured to draw power; and
   a clock circuit externally coupled to the single wire interface and configured to dynamically adapt a frequency of a clock signal based on available power of the single wire system by
      detecting a voltage from the single wire interface and generating the clock signal having the frequency based on the detected voltage.

2. The integrated circuit of claim 1, wherein the clock circuit is configured to decrease the frequency of the clock signal based on a determination of the detected voltage being below a threshold voltage.

3. The integrated circuit of claim 1, wherein the clock circuit is configured to adjust the frequency of the clock signal to a target frequency within a range of specified frequencies based on a difference between the detected voltage and a threshold voltage.

4. The integrated circuit of claim 1, wherein the clock circuit is configured to:
   detect a rectified voltage from the single wire interface over a period of time, and
   adjust the frequency of the clock signal based on the detected rectified voltage.

5. The integrated circuit of claim 1, wherein the clock circuit comprises at least one of:
   a digital circuit comprising a plurality of frequency dividers, or
   an analog circuit.

6. The integrated circuit of claim 1, wherein the clock circuit is configured to:
   cease generating the clock signal if the voltage from the single wire interface drops to zero for a period of time.

7. The integrated circuit of claim 1, wherein the frequency is proportional to the detected voltage.

8. The integrated circuit of claim 1, wherein the frequency is between first and second other frequencies.

9. A method comprising:
   drawing power from a single wire interface of a single wire system; and
   dynamically adapting a frequency of a clock signal of a clock circuit of the single wire system based on available power of the single wire system by detecting a voltage from the single wire interface and generating the clock signal having the frequency based on the detected voltage.

10. The method of claim 9, further comprising:
    decreasing the frequency of the clock signal based on a determination of the detected voltage being below a threshold voltage.

11. The method of claim 9, further comprising:
    adjusting the frequency of the clock signal to a target frequency within a range of specified frequencies based on a difference between the detected voltage and a threshold voltage.

12. The method of claim 9, further comprising:
    detecting a rectified voltage from the single wire interface over a period of time, and
    adjusting the frequency of the clock signal based on the detected rectified voltage.

13. The method of claim 9, wherein the frequency is proportional to the detected voltage.

14. The method of claim 9, wherein the frequency is between first and second other frequencies.

15. A system comprising:
    a user system; and
    a single wire system coupled with the user system by a single wire, the single wire system comprising:
       a single wire interface coupled to the single wire and from which the single wire system is configured to draw power;
       a clock circuit externally coupled to the single wire interface and configured to dynamically adapt a frequency of a clock signal based on available power of the single wire system by
          detecting a voltage from the single wire interface and generating the clock signal having the frequency based on the detected voltage.

16. The system of claim 15, wherein the clock circuit is configured to:
    decrease the frequency of the clock signal based on a determination of the detected voltage being below a threshold voltage.

17. The system of claim 15, wherein the clock circuit is configured to:
    adjust the frequency of the clock signal to a target frequency within a range of specified frequencies based on a difference between the detected voltage and a threshold voltage.

18. The system of claim 15, wherein the clock circuit is configured to:
    detect a rectified voltage from the single wire interface over a period of time, and
    adjust the frequency of the clock signal based on the detected rectified voltage.

19. The system of claim 15, wherein the frequency is proportional to the detected voltage.

20. The system of claim 15, wherein the frequency is between first and second other frequencies.

* * * * *